(12) United States Patent
Richmond et al.

(10) Patent No.: US 7,380,956 B2
(45) Date of Patent: Jun. 3, 2008

(54) ORNAMENT WITH IMAGE PROJECTOR

(75) Inventors: Rebecca M. Richmond, Overland Park, KS (US); Ronald L. Carlson, Riverside, MO (US); Carol Kobza, Prairie Village, KS (US); Stephen E. Finken, Overland Park, KS (US); Therese F. Steiger, Liberty, MO (US); Brenda S. Klenke, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 206 days.

(21) Appl. No.: 11/152,817

(22) Filed: Jun. 14, 2005

(65) Prior Publication Data

US 2006/0291237 A1    Dec. 28, 2006

(51) Int. Cl.
*F21V 33/00*    (2006.01)
(52) U.S. Cl. .................. 362/123; 362/121; 362/807
(58) Field of Classification Search ............... 362/564, 362/565, 561, 121, 123, 806, 654, 811; 428/11, 428/19
See application file for complete search history.

(56) References Cited

U.S. PATENT DOCUMENTS

| 1,288,145 | A |   | 12/1918 | Noville |
| 1,930,359 | A |   | 10/1933 | Hilgenberg |
| 2,059,653 | A |   | 11/1936 | Pretzfelder |
| 2,199,434 | A |   | 5/1940 | Koonz |
| 2,199,435 | A |   | 5/1940 | Koonz |
| 2,207,117 | A |   | 7/1940 | Collins |
| 2,345,517 | A |   | 3/1944 | Weiss |
| 2,653,216 | A |   | 9/1953 | Protz |
| 2,671,286 | A |   | 3/1954 | Hansen |
| 2,839,670 | A |   | 6/1958 | Gladstone |
| 2,918,034 | A |   | 12/1959 | Neugass |
| 3,400,263 | A |   | 9/1968 | Yakim |
| 3,594,934 | A | * | 7/1971 | Burnbaum ................... 40/430 |
| 3,694,648 | A |   | 9/1972 | Yates |
| 3,873,880 | A |   | 3/1975 | Riddell |
| 4,339,787 | A |   | 7/1982 | Burnbaum |
| 4,475,298 | A |   | 10/1984 | Munoz |
| 4,601,924 | A |   | 7/1986 | Birkes et al. |
| 4,782,434 | A |   | 11/1988 | Cole |
| 4,833,580 | A |   | 5/1989 | Allen |
| 4,866,580 | A |   | 9/1989 | Blackerby |
| 4,930,053 | A |   | 5/1990 | Vaught |
| 4,942,685 | A |   | 7/1990 | Lin |
| 4,975,809 | A |   | 12/1990 | Ku |

(Continued)

OTHER PUBLICATIONS

OrnaGlow product packaging, 1 page, believed to have been publicly available before Jun. 1, 2005.

(Continued)

*Primary Examiner*—Stephen F. Husar
*Assistant Examiner*—Peggy A. Neils
(74) *Attorney, Agent, or Firm*—Fish & Richardson P.C.

(57) ABSTRACT

Some embodiments of a decoration apparatus may have an attractive appearance and multi-functional capabilities. The decoration apparatus may include one or more internal light sources that provide lighting effects in combination with decorative elements formed in the structure. In addition to providing internal lighting effects, the decoration apparatus may include a projector device, which is capable of displaying a light pattern on a remote surface, such as a wall or a ceiling.

22 Claims, 13 Drawing Sheets

U.S. PATENT DOCUMENTS

| | | |
|---|---|---|
| 5,124,890 A | 6/1992 | Choi et al. |
| 5,217,286 A * | 6/1993 | Ming-ho .................... 362/612 |
| 5,250,331 A | 10/1993 | Grefalda |
| 5,266,771 A | 11/1993 | Van Wyk |
| RE34,717 E | 9/1994 | Sanders et al. |
| 5,378,512 A | 1/1995 | Van Wyk |
| 5,576,078 A | 11/1996 | Schatz |
| 5,613,764 A | 3/1997 | O'Brien |
| 5,743,616 A | 4/1998 | Giuliano et al. |
| 5,772,312 A | 6/1998 | Pihl-Niederman et al. |
| 5,813,747 A | 9/1998 | Kale |
| 5,820,251 A | 10/1998 | Greenberg et al. |
| 5,823,661 A * | 10/1998 | Mahanay et al. ........... 362/293 |
| 5,828,183 A | 10/1998 | Wang et al. |
| 5,865,533 A | 2/1999 | Liu |
| 5,876,112 A | 3/1999 | Wu |
| 6,000,820 A | 12/1999 | Murray |
| 6,048,591 A | 4/2000 | Zwiebel |
| 6,135,599 A | 10/2000 | Fang |
| 6,143,381 A | 11/2000 | Hawkins |
| 6,145,228 A | 11/2000 | LaChance |
| 6,224,230 B1 | 5/2001 | Roegiers |
| 6,285,472 B1 | 9/2001 | Odhner et al. |
| 6,361,198 B1 | 3/2002 | Reed |
| 6,398,388 B1 | 6/2002 | Lorenzana et al. |
| 6,399,167 B1 | 6/2002 | Lewis, Jr. |
| 6,439,723 B1 | 8/2002 | Tano |
| 6,552,831 B2 | 4/2003 | Odhner et al. |
| 6,652,349 B1 | 11/2003 | Wichter |
| 6,672,738 B1 | 1/2004 | Lewis et al. |
| 6,712,493 B2 | 3/2004 | Tell et al. |
| 6,764,205 B2 | 7/2004 | Peloquin |
| 6,832,842 B2 | 12/2004 | Sullivan |
| 6,933,680 B2 * | 8/2005 | Oskorep et al. ............ 315/178 |
| 7,086,770 B2 | 8/2006 | Tell et al. |
| 2003/0210541 A1 | 11/2003 | Long |
| 2004/0207341 A1 | 10/2004 | Callahan |
| 2004/0223326 A1 | 11/2004 | Wainwright |
| 2004/0257007 A1 | 12/2004 | Lys et al. |

OTHER PUBLICATIONS

Holiday Living product packaging, 5 pages, 2004.

* cited by examiner

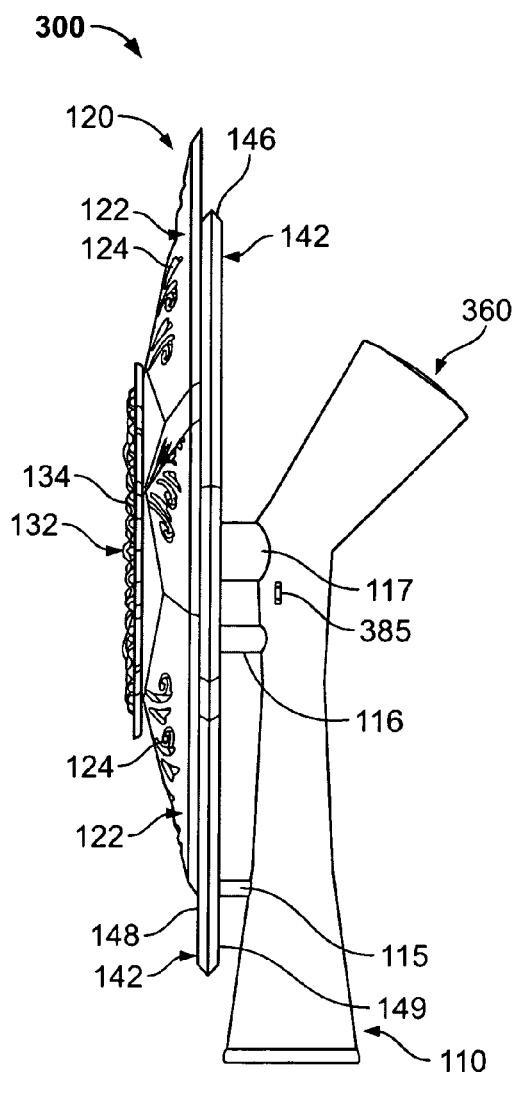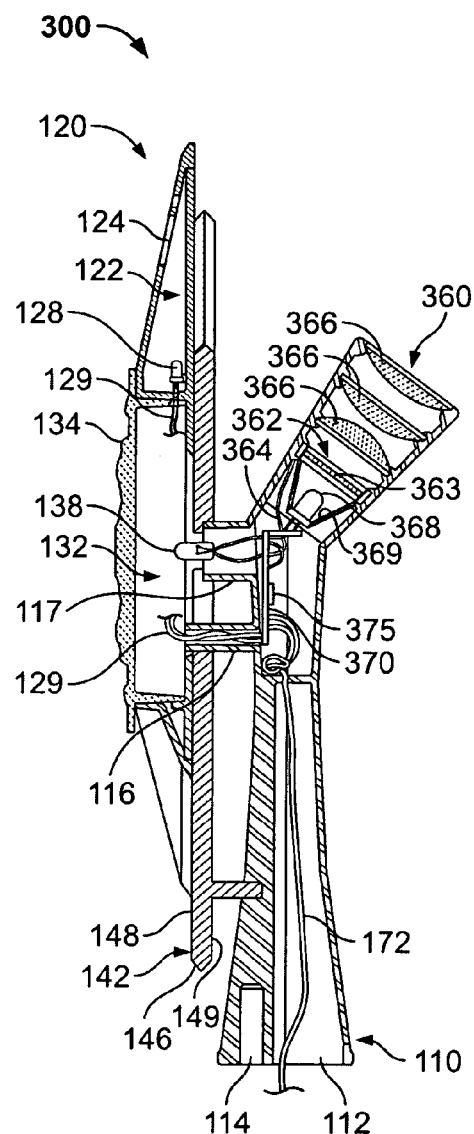
FIG. 14
FIG. 15

ORNAMENT WITH IMAGE PROJECTOR

TECHNICAL FIELD

This document relates to decorating with a lighted device, such as a holiday ornament.

BACKGROUND

Decorations are often used as part of a celebration of an event or a season. For example, a living area or a shopping mall may be decorated with a Christmas tree having strings of lights and colored bulbs as part of the Christmas holiday season. A larger decoration placed on the top of a Christmas tree could be perceived as the main attraction of the Christmas tree. In another example, a Menorah or other lighted decoration may be employed as part of a Chanukah celebration.

In some circumstances, lighting effects may be used to provide a desired appearance to the decorations. For example, a jack-o-lantern pumpkin ornament may include an internal light bulb to produce a glowing effect during the nighttime celebration of Halloween. In an alternative example, if a decorative device is intended to appear as a Menorah, the device may be a formed part having colorations and the shape of a nine-branched candelabrum. Such a Menorah decoration may incorporate light bulbs at the tips of the candles to provide the appearance of burning candles.

SUMMARY

A decorative device may include both an ornament structure and an integral projector device to display on a wall, ceiling, etc. an image optionally associated with the a decorative theme of the ornament structure. In various embodiments, the decoration apparatus may include one or more internal lights that provide lighting effects in combination with decorative elements formed in the ornament structure. In one embodiment, the decorative apparatus may be disposed proximal to the top of a Christmas tree so that the internal lighting effects of the apparatus may adorn the tree while the external projection may be displayed on a ceiling or wall near the apparatus. The decorative apparatus may include an ornament portion having a plurality of decorative elements formed in the ornament portion. The decorative apparatus may also include a base portion operable to releasably mount to a top portion of a tree. The apparatus may further include a projector device having a projection light source. When the projection light source is activated, light is emitted to project a pattern onto a remote surface, such as a ceiling or a wall.

These and other embodiments may be configured to provide one or more of the following advantages. First, the decoration apparatus may have the structure of a tree topper decoration that utilizes its location near a ceiling or a wall to provide both internal lighting effects and an external projection of a decorative pattern. Second, the decoration apparatus may include synchronized light effects that simulate a recognizable light pattern, such as the brightening and fading effects of a star. Third, the decoration apparatus may employ light piping and back lighting effects to enhance the surface and edge elements formed in the ornament structure. Fourth, the decoration apparatus may include both substantially upward and forward light projection. The forward light projection may be provided when light from internally disposed light sources is emitted through a pattern of openings in the front face of the ornament structure. The substantially upward light projection may be provided when a projection device has a sufficiently bright LIGHT SOURCE to display a pattern onto a nearby surface. The projected pattern may be substantially defined by an image-bearing mask (e.g., a film negative or a stencil), which is magnified and focused when the light passes through a set of lenses. Alternatively, the projected pattern may be defined by an LCD (liquid crystal display) projection panel so as to provide a moving image or a changing sequence of images.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 14 is a perspective view of a decoration apparatus in accordance with some embodiments of the invention.

FIG. 15 is a cross-sectional view of the decoration apparatus of FIG. 14.

Like reference symbols in the various drawings indicate like elements.

DETAILED DESCRIPTION OF ILLUSTRATIVE EMBODIMENTS

Figure 1A:
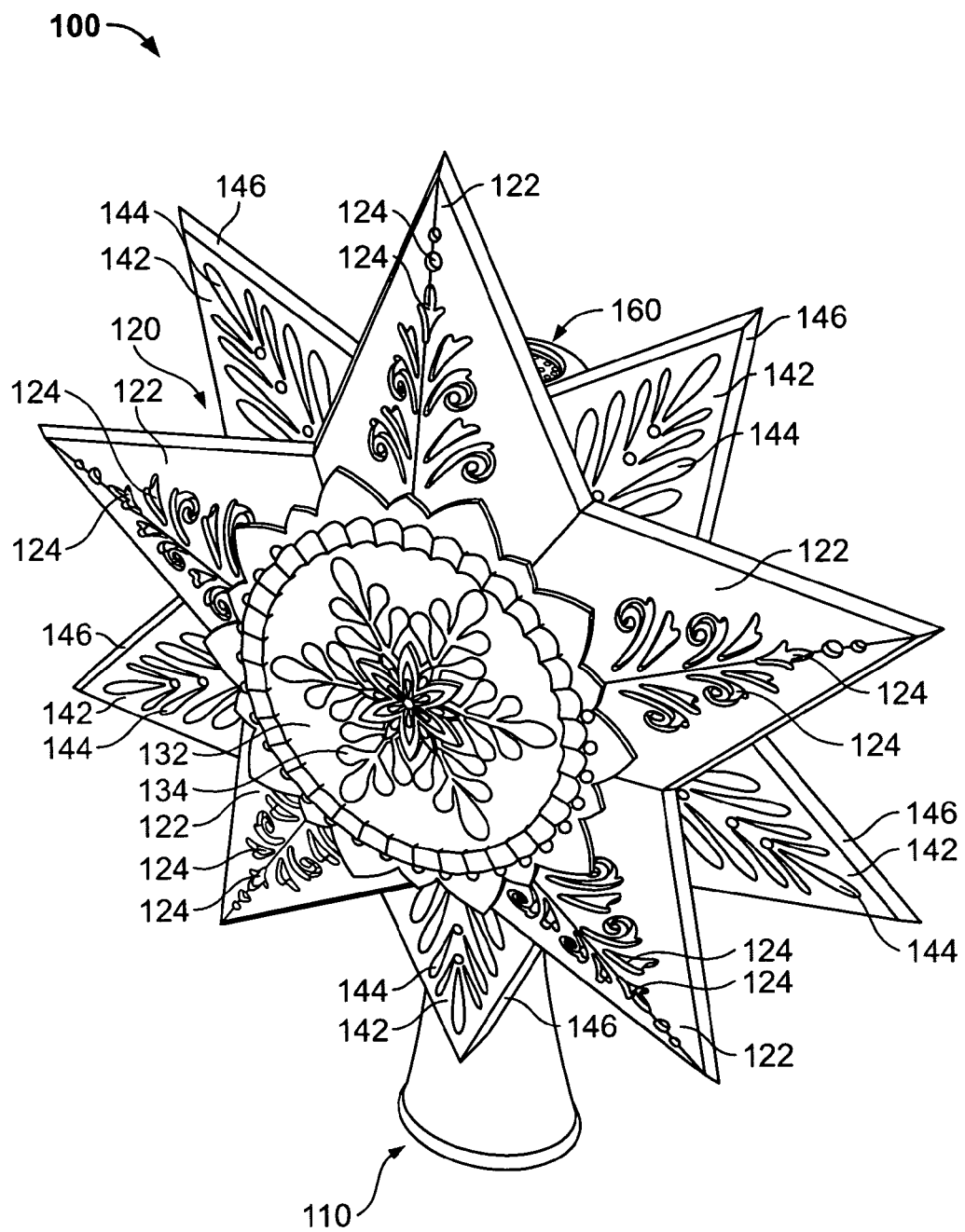
FIG. 1A is a perspective view of a decoration apparatus in accordance with some embodiments of the invention.
Figure 1B:
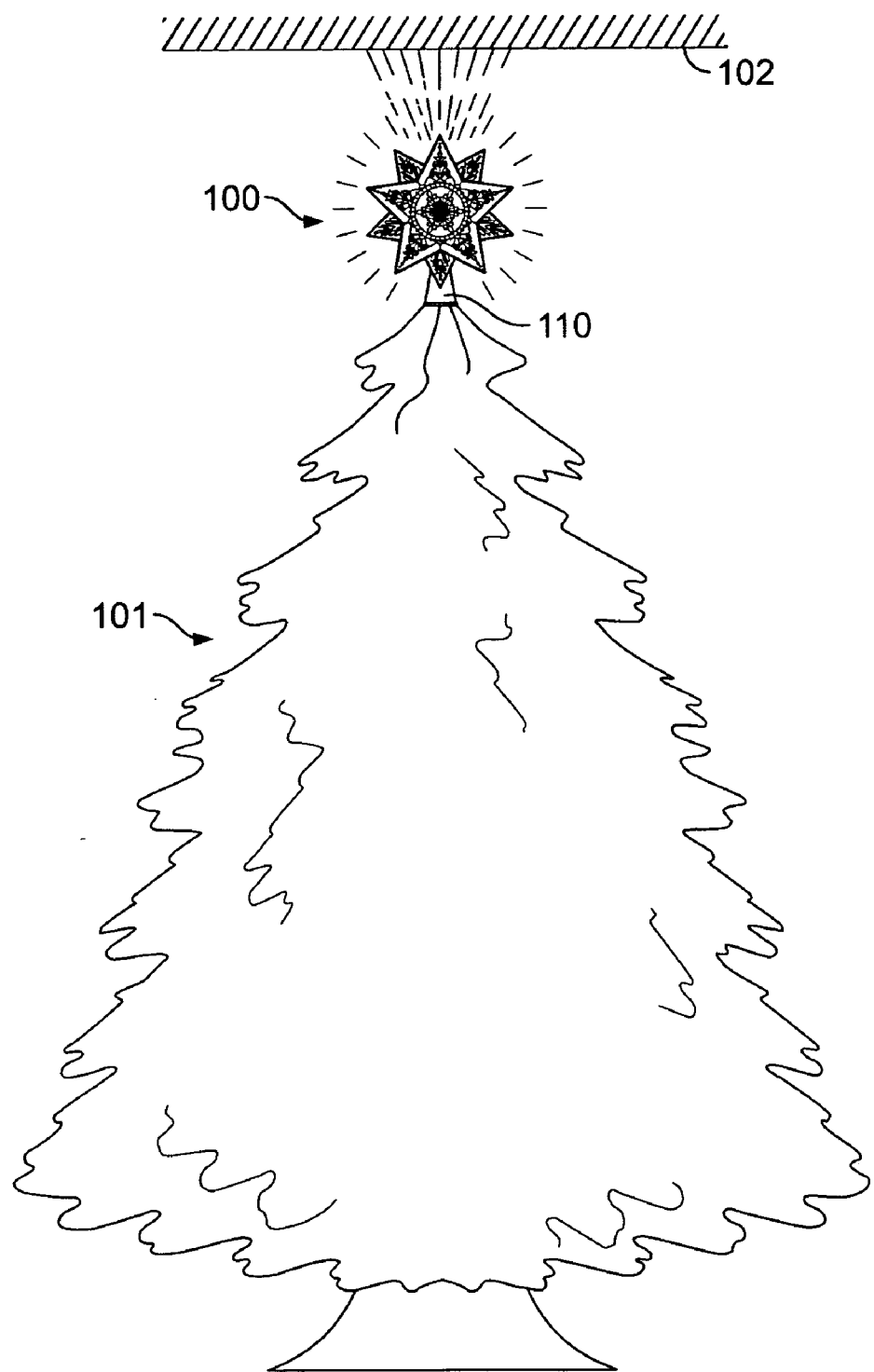
FIG. 1B is a front view of a tree and the decoration apparatus of FIG. 1A.

Referring to FIGS. 1A-B, a decoration 100 may include an ornament structure 120 and a projector device 160. In some embodiments, the decoration 100 may be configured to function as tree topper device and may include a base 110 that releasably attaches to a top portion of a Christmas tree 101 (FIG. 1B). In this embodiment, the ornament structure 120 is shown as a star-shaped structure, but it should be recognized other embodiments of the decoration 100 may have a shape familiar to an applicable season or event, such as the shape of an angel or a Santa Claus character that is sometimes associated with the Christmas season. It should also be understood that other embodiments of the decoration 100 may be configured to be placed on a mantle, a tabletop, a wall, or other decorative locations. In those embodiments, the base 110 may have a different shape so as to facilitate placement of the decoration 100 in those various locations.

Referring to FIG. 1A, the ornament structure 120 may include one or more hollow portions 122. The hollow portions 122 may include decorative elements, such as die-cut openings 124 formed in the front surface thereof, each of which may be enhanced by one or more internal light sources. The light emitted from the internal light sources may project forwardly through the openings 124 from inside the hollow portion 124 (refer also to FIG. 3). In this embodiment, the hollow portions 122 are configured to be the points of the star-shaped ornament structure 120, and the die-cut openings 124 formed in the surface of the hollow portions 122 have a decorative pattern that is similar on each of the points. In addition, the hollow portions 122 may comprise a light transmissive material that permits at least some light to transmit through the material, thereby providing a glowing appearance. For example, the ornament structure 120 may comprise a substantially translucent SAN (Styrene Acrylonitrile) material, which permits some light from the internal light sources to transmit through the material. In such circumstances, each hollow portion 122 may have provide a low-level glow while substantially brighter light emits through the openings 124. In certain embodiments, the internal surfaces of the hollow portions 122 may have a substantially reflective coating (e.g., a white colored surface coating) applied there to enhance the light that is emitted through the die-cut openings 124. In those embodiments, the light projected from the openings 124 may be much brighter than any light that is transmitted through the outer shell material of the hollow portions 122.

In the embodiment shown in FIG. 11A, the ornament structure 120 may include a central portion 132 that includes another decorative element, such as an surface pattern 134 formed in the front surface thereof. In this embodiment, the surface pattern 134 comprises a snowflake pattern, but it should be understood that other surface patterns may be formed in the central portion 132. The central portion 132 may include a hollow chamber in which an central light source is disposed (as shown, for example, in FIG. 3). The surface pattern 134 may be embossed in a substantially transparent or translucent material such that the central light source causes the surface pattern 134 to glow. If, for example, the ornament structure 120 comprises a substantially translucent SAN (Styrene Acrylonitrile) material, some light from the internal central light source may transmit through the central portion 132 to provide a low-level glowing appearance, but the surface pattern 134 may appear substantially brighter or more defined by the light. This backlighting effect may be caused by the light passing through the embossed material and bending at different angles in the curves, grooves, corners, and edges of the surface pattern 134.

Still referring to FIG. 1A, the ornament structure 120 may include one or more substantially solid members 142 that are capable of transmitting light from an internal light source. For example, the substantially solid members 142 may employ light from a central light source 138 to provide lighting effects such as light piping and edge lighting (as shown, for example, in FIG. 3). In this embodiment, the substantially solid members 142 are configured to be the points of the star-shaped ornament structure 120 such that the hollow portions 122 comprise a front star points and the substantially solid members 142 comprise a back star points. Together, the hollow portions 122 and the substantially solid members 142 may operate to provide lighting effects that simulate a glowing star (described in more detail below). The substantially solid members 142 may comprise a light transmissive material that permits at least some light to transmit through the material. For example, the ornament structure 120 may comprise a substantially translucent SAN (Styrene Acrylonitrile) material, which permits some light from an internal light source to transmit through the material. In this embodiment, the light from the central internal light source (as shown, for example, in FIG. 3) may be transmitted through a first, inwardly facing edge of each substantially solid member 142. The light passes through each member 142, causing a light piping effect and thereby providing a glowing appearance. Some light traveling through the members 142 may pass through the surface patterns 144 formed in the front surface of each member 142. The surface patterns 144 in the substantially solid members 142 may appear brighter or more defined by the light due to the light bending at different angles in the curves, grooves, corners, and edges of the surface patterns 144. Also in this embodiment, some light transmitting through the members 142 may pass through the outwardly facing edges 146 of each member 142, causing an edge lighting effect. The edges 146 of each member 142 may appear brighter or more defined by the light (compared to the front and rear surfaces) due to the light bending at different angles along the beveled edge surfaces 146.

Accordingly, the embodiment shown in FIG. 1 may include one or more internal light sources that enhance decorative elements in the ornament structure 120. Such internal lighting effects may be accomplished by projecting light forward through openings 124 in the surface of the hollow portions 122, by backlighting through a surface pattern 134 formed the central portion 132, by light piping through the substantially solid members 142 to provide a glowing effect, by edge lighting through the outwardly facing ends 146 of the substantially solid members 142, or by a combination thereof.

Referring to FIG. 1B, some embodiments of the decoration 100 may be configured as a tree topper device, which may be releasably attached to an upper portion (e.g., proximal to the top stem) of a Christmas tree 101. In the depicted embodiment, the base 110 has a tubular shape that is adapted to receive the top stem or another portion of the Christmas tree 101. Other configurations of the base 110 may include a supplemental shaft that extends downward from the base 110 and is secured to a substantially rigid portion of the Christmas tree 101 using Velcro™ straps or the like. As previously described, the decoration 100 may include a projector device 160 (FIG. 1A) that is capable of providing a light pattern on a nearby surface 102, such as a ceiling or a wall. In the embodiments in which the decoration 100 is configured as a tree topper device, the intended site (proximal to the pinnacle of a tree 101 and positioned near a surface 102) may be fully utilized both to adorn the tree 101 with an internally lit device and to decorate a nearby surface 102. As such, the decoration 100 may provide multi-functionality while consuming a relatively small amount of space. Moreover, the decorative design that is used to adorn the tree 101 may be associated to the projected pattern display on the nearby surface 102. For example, the projector device 160 may be equipped with an image-bearing mask (described in more detail below) having a stars and snowflake pattern that is projected onto the surface 102, which is associated with the stars and snowflake design of the ornament structure 120. In such embodiments, the decorative theme used to adorn the tree 101 may be part of a greater theme to decorate other parts of the room.

Figure 2:
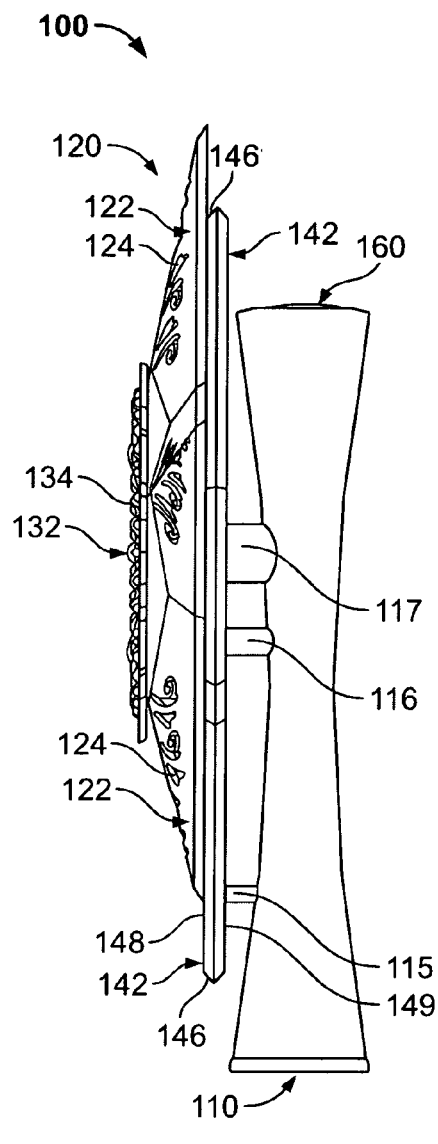
FIG. 2 is a side view of the decoration apparatus of FIG. 1A.
Figure 3:
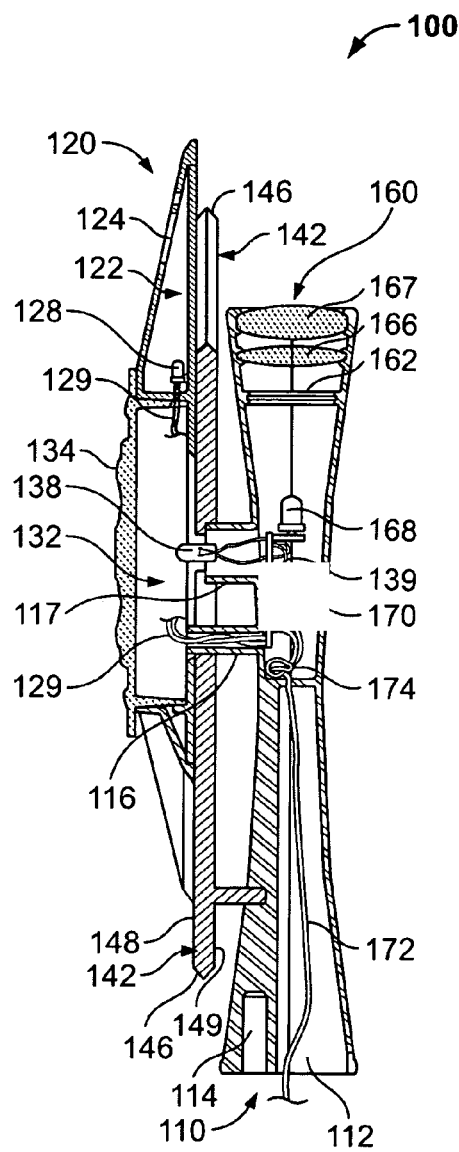
FIG. 3 is a cross-sectional view of the decoration apparatus of FIG. 2.

Referring now to FIGS. 2-3, some embodiments the ornament structure 120 may be coupled to the base 110 by one or more support shafts 115, 116, and 117. In such embodiments, the ornament structure 120 may be positioned forwardly of the base 110 and the projector device 160 so that the project device is substantially concealed from the front side of the decoration 100. Some of the shafts, such as shafts 116 and 117, may be hollow so as to accommodate wires that are connected to the internal light sources 128 and the internal central light source 138 (shown in FIG. 3). The base 110 and the shafts 116 and 117 may comprise a substantially rigid and flame-resistant material, such a polymer or metal material. For example, the base 110 and shafts 116 and 117 may be thermoformed from Acrylonitrile Butadiene Styrene (ABS) material.

The base 110 may comprise a tubular body that includes one or more cavities 112 and 114 and that houses the projector device 160. In this embodiment, a first cavity 112 is disposed near the bottom of the base 110 and is configured to receive an upper portion of a tree 101 (FIG. 1B). Also, the base 110 may include a second cavity 114 that is adapted to receive a supplemental support shaft (not shown in FIGS. 2-3) that can extend downwardly and be releasably attached to a substantially rigid portion of the tree 101. In other embodiments in which the decoration 100 is configured to be mounted on a mantle, a tabletop, a wall, or other decorative locations, the base 110 may include cavities or mounting brackets in various arrangements so as to facilitate placement of the decoration 100 in those locations. For example, some embodiments of the decoration 100 may include a base having a mounting bracket with a substantially horizontal bottom surface. In such embodiments, the flat bottom surface of the base may be used to retain the decoration in an upright position as the decoration 100 is placed on a mantle or a tabletop.

Referring to FIG. 3, the projector device 160 may be housed in an upper portion of the base 110 so that a light pattern can be projected from the decoration 100. In this embodiment, the projector device 160 may comprise a projection light source 168, an image pattern 162, and one or more lenses 166 and 167 to magnify and/or focus the image. The projection light source 168 may be a megabright light-emitting diode (single or multicolor) so as to provide greater clarity and brightness to the image pattern projected to the nearby surface. For example, the projection light source 168 may be a water-clear white UB light-emitting diode having a brightness of 13,000 mcd (Millicandelas) or greater. In this example, the projected image may be about 20-inches wide when projected on a targeted surface at a distance of about 24-inches from the projector device 160. In this embodiment, the projector device 160 is arranged to provide the light pattern in a generally upward direction (see, e.g., FIG. 1B), yet other embodiments of the decoration 100 may include a projector device 160 that is capable of projecting a light pattern in a non-vertical direction, such as sideways toward a wall surface or angled downwardly toward a nearby floor surface.

Still referring to FIG. 3, the decoration 100 may include an central light source 138 that is disposed proximal to the central portion 132. The central light source 138 may emit light that is transmitted through the surface pattern 134 to provide the previously described backlighting effects. In addition, the central light source 138 may emit that is transmitted through the substantially solid members 142 to provide the previously described light piping effects and the edge lighting effects. For example, a portion of the light emitted from the central light source 138 may pass through the inwardly facing edge of each substantially solid member 142, through the body of the member 142, and out the front and rear faces 148 and 149. Such an operation may cause a light piping effect so that the substantially solid member 142 has a glowing appearance. In addition, some light passing through the body of each member 142 may exit from the outwardly facing edges 146, which can provide the previously described edge lighting effects. Accordingly, the central light source 138 can be the source for backlighting effects through the surface pattern 134 and for the light piping and edge lighting effect through the members 142. In some embodiments, the central light source 138 may be an incandescent light bulb having a brightness of about 0.4 MSCP (Mean Spherical Candlepower). Such a light source may provide a sufficient amount of brightness depending upon the transmissivity of the ornament structure material, the thickness of the ornament structure walls, and other factors.

In the embodiment shown in FIG. 3, each hollow portion 122 is equipped with an associated light source 128 that is capable of emitting light to forwardly project out of the openings 124 formed in the front side of each hollow portion 122. For example, in the embodiment depicted in FIG. 1A and FIG. 3, the decoration 100 includes five hollow portions 122, each having the shape of a point of a star. Each of the five hollow portions 122 includes a light source 128 disposed at least partially therein, as shown in FIG. 3. In such circumstances, each of the hollow portions 122 may be independently illuminated such that the star points can be synchronized to display various brightening and fading effects that substantially simulate starlight. As described in more detail below, one or more programmable controllers may be employed to independently illuminate/dim the internal light sources 28. Each of the light sources 128 may be a light-emitting diode (multicolored or single color). Each light source 128 may emit a light color similar to or different from the central light source 138 and/or the other light sources 128. In one example, the central light source 138 emits a substantially white light through the surface pattern 134 and through the substantially solid members 142 while each of the light sources 128 emits a substantially yellow light through the openings 124 in the hollow portions 122. When such a multicolored arrangement of this example is used in combination with the synchronized brightening/fading effects in the star-point portions, the decoration 100 may provide a pleasing simulation of sparkling starlight that includes a bright, white light near the center and includes a time-varying, yellow light near star points.

Still referring to FIG. 3, each of the light sources 128 may be electrically connected to a circuit 170 using wires 129. In this embodiment, the wires 129 pass through the hollow shaft 115 to connect to the circuit 170 disposed in the tubular body of the base 110. Also in this embodiment, the central light source 138 is electrically connected to the circuit 170 via wires 139 that pass through the hollow shaft 117. The projection light source 168 may be electrically connected to the circuit 170 using wires or using a surface mount connection. In the embodiment shown in FIG. 3, the projection light source 168 is positioned near the circuit 170 so that the projection light source 168 may be surface mounted directly to the circuit 170. The circuit 170 may be electrically connected to a power source (not shown in FIG. 3) using a wire 172 that passes through the base 110. The wire 172 may include a knot 174 or a strain relief member so as to prevent the wire 172 from being pulled out of connection with the circuit 170. As described in more detail below in connection with FIG. 13, the circuit 170 may include a programmable controller that is capable of independently illuminating and fading the light sources that are electrically connected thereto.

Figure 4:
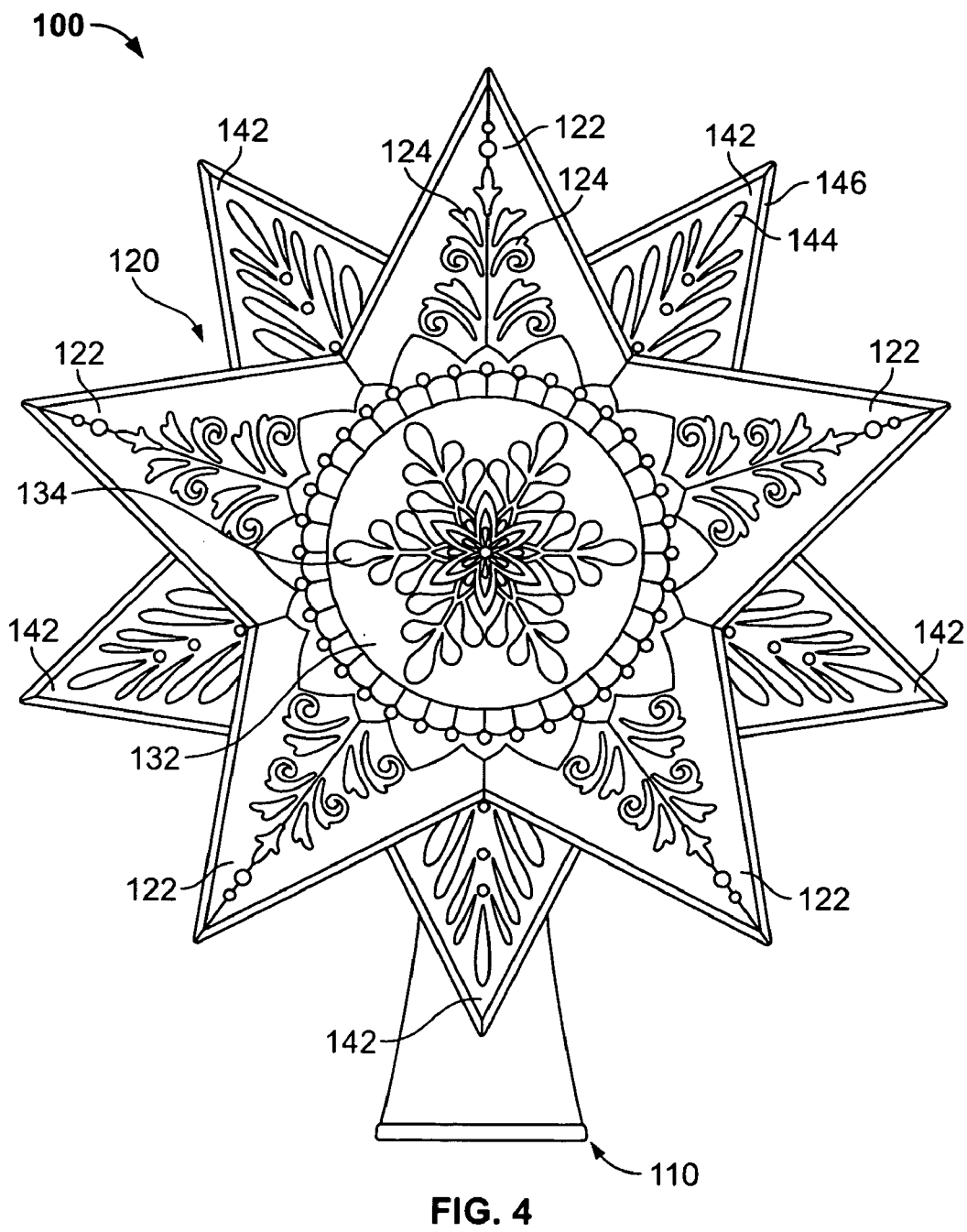
FIG. 4 is a front view of the decoration apparatus of FIG. 1A.
Figure 5:
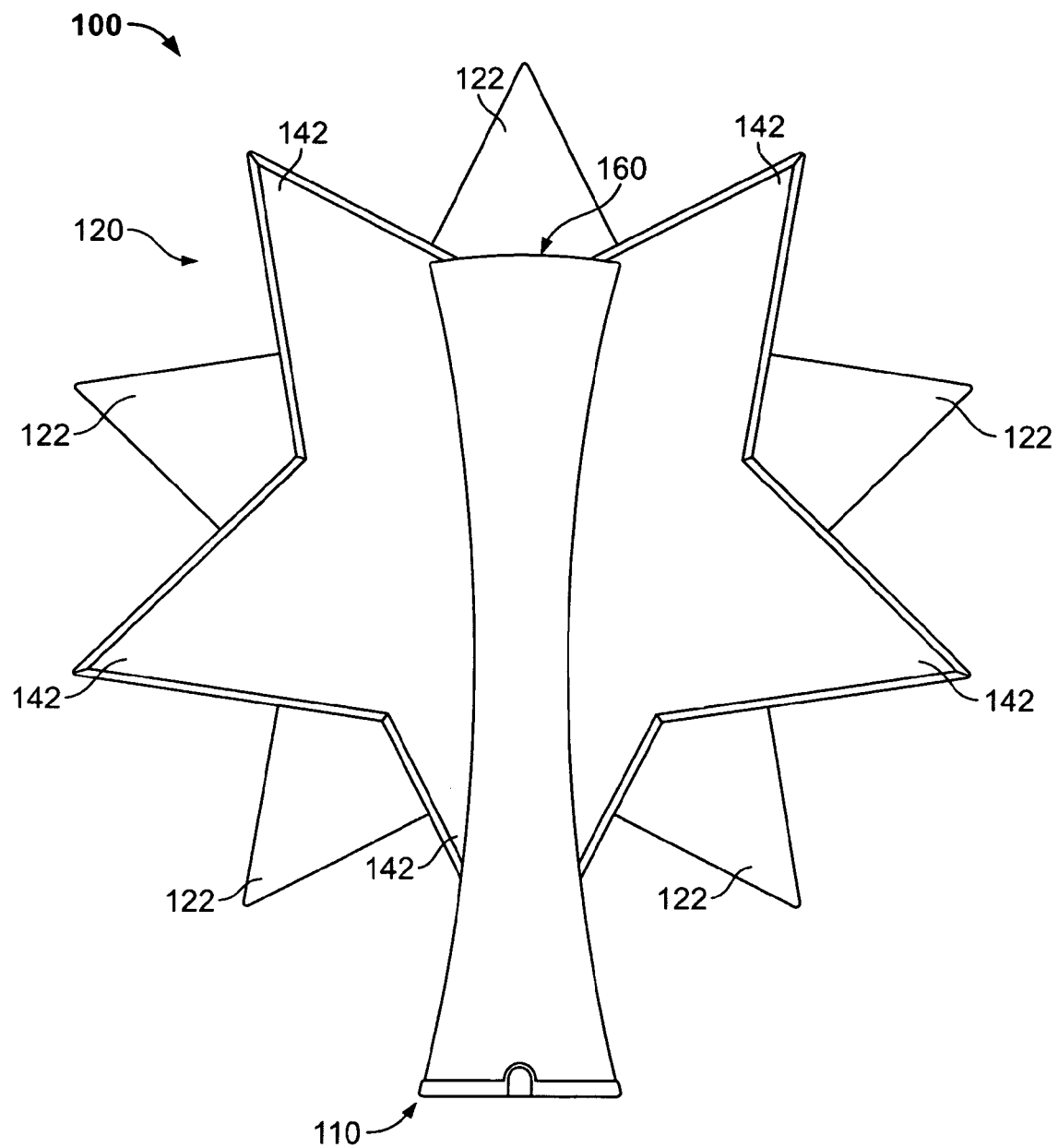
FIG. 5 is a rear view of the decoration apparatus of FIG. 1A.

Referring now to FIGS. 4-5, the ornament structure 120 may be disposed in front of the body of the base 110 so as to conceal a substantial portion of the base 110. In such circumstances, the projector device 160 that is housed in the base 110 may be substantially concealed from view from the front side of the decoration 100. By substantially concealing the projector device 160 from direct view from the front side, the projector device 160 may provide a light pattern on an nearby surface 102 (see, e.g., FIG. 1B) without detracting from the adornment features provided by the ornament structure 120 and the internally disposed light sources 128 and 138. In some embodiments in which the decoration 100 is configured to be a tree topper device, the decorative elements (e.g., the openings 124 and the surface patterns 134 and 144) may be formed primarily on the front side of the decoration, which can be the portion of the decoration 100 that is generally exposed to viewers. By forming the decorative elements on the primarily viewed portion, the manufacturing costs may be reduced without substantially detracting from the adornment provided by the decoration 100. Although the embodiment depicted in FIGS. 4-5 show the decorative elements (e.g., the openings 124 and the surface patterns 134 and 144) formed primarily on the front side of the decoration 100, it should be understood that other embodiments may include similarly formed decorative elements on the rear side of the decoration. For example, surface patterns 144 may be formed on the rear side of the substantially solid members 142, and some die-cut openings 124 may be formed on the rear side of the hollow portions 122.

Figure 6:
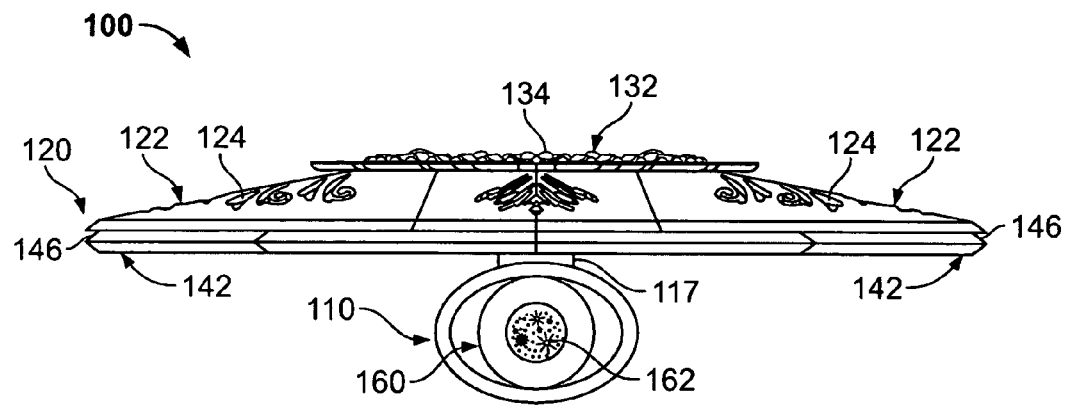
FIG. 6 is a top view of the decoration apparatus of FIG. 1A.

Referring now to FIG. 6, some embodiments of the decoration may include the projector device 160 proximal an upper portion of the base 110 so that the projector device is directed in a substantially upward direction. As previously described, the projector device 160 may include an image-bearing mask 162. One or more lenses 166 and 167 (FIG. 3) may be positioned over the image-bearing mask 162 so as to magnify and/or focus the light image that is projected from the projection light source 168 through the image-bearing mask 162. The mask 162 may be disposed on a substrate so that light does not pass through generally opaque portions of the mask 162, but may pass through openings or substantially transparent portion in the mask 162. For example, the image-bearing mask 162 may be formed as a stencil in a generally opaque substrate. In this example, the substrate may be a polymer or plastic disc having apertures formed therein to produce the desired image pattern 162. In another example, the image-bearing mask 162 may be formed as a film negative of the desired image. In such circumstances, the film negative may have substantially opaque, dark areas through which light does not generally pass and may also have substantially transparent portions that produce the desired image. The film may have a colored tint, such as a red or green tint, so that the projected image appears in that color. Alternatively, a colored gel layer may be positioned between the projection light source 168 (FIG. 3) and the projection surface 102 (FIG. 1B) so that the projected image appears in that color. In the embodiment depicted in FIG. 6, the image-bearing mask 162 comprises a snowflake and star pattern, but it should be understood that other image patterns may be used depending upon the holiday or season being celebrated and/or depending upon theme included in the decorative elements (e.g., surface patterns 134 and 144) of the ornament structure 120. In one example, the ornament structure 120 may have the shape of an angel or may have decorative elements (e.g., surface patterns 134 and 144) in the shape of angels. In such cases, the image-bearing mask 162 of the projector device 160 may be in the shape of an angel, a halo, angel wings, or another thematically related image.

In some embodiments, the image-bearing mask 162 may be removable from the housing of the decoration 100. In such circumstances, a user may remove a first mask 162 and replace it with a second mask so that a different image pattern is projected onto the nearby surface. A series of masks 162, each having a different image pattern thereon, can be provided to the user in the form of removable cartridges that can be inserted into an input slot proximal to the projection light source 168.

Figure 7:
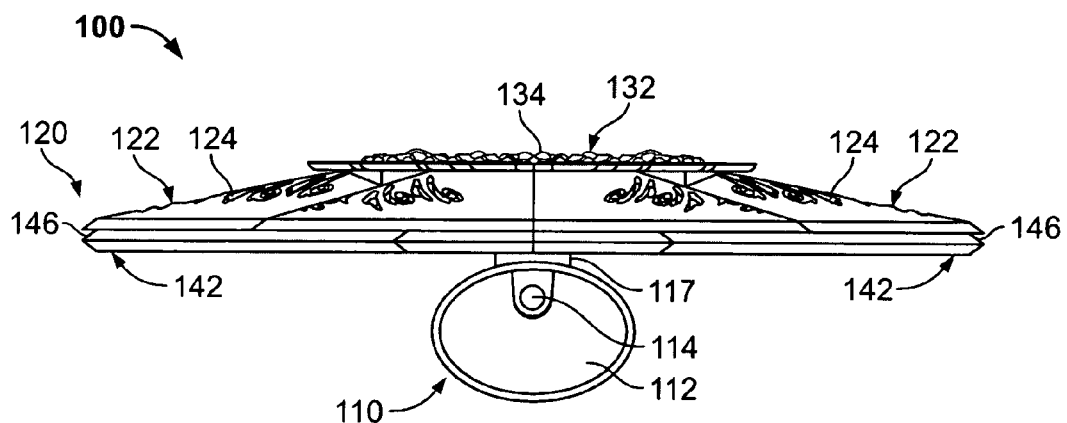
FIG. 7 is a bottom view of the decoration apparatus of FIG. 1A.

Referring now to FIG. 7, some embodiments of the base 110 may include one or more cavities proximal the bottom portion of the base 110. As previously described, the first cavity 112 is disposed near the bottom of the base 110 and is configured to receive an upper stem of a tree 101 (FIG. 1B). Also, the second cavity 114 that is adapted to receive a supplemental support shaft (not shown in FIGS. 2-3) that can extend downwardly and be releasably attached to a substantially rigid portion of the tree 101. In other embodiments in which the decoration 100 is configured to be mounted on a mantle, a tabletop, a wall, or other decorative locations, the base 110 may include cavities or mounting brackets in other arrangements so as to facilitate placement of the decoration 100 in those locations.

Figure 8:
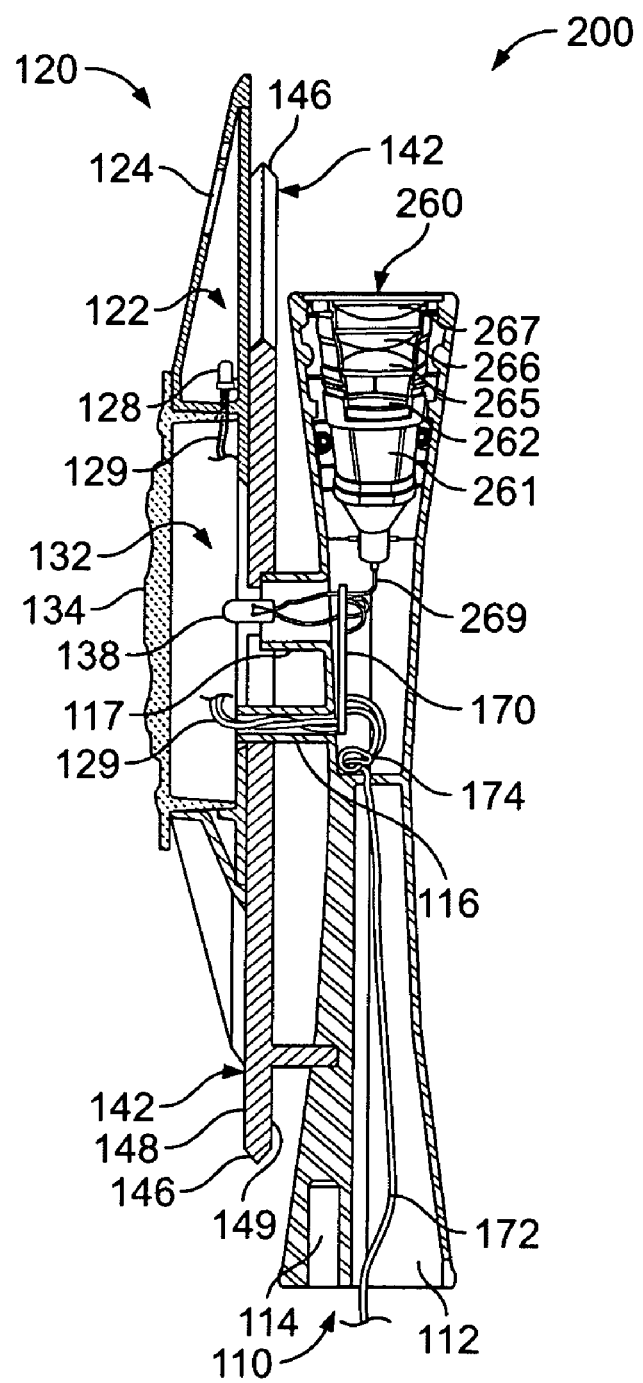
FIG. 8 is a cross-sectional view of a decoration apparatus in accordance with some embodiments of the invention.

Referring to FIG. 8, another embodiment of the decoration 200 may include a self-contained projector device 260 that is fit into the upper portion of the base 110. As previously described in connection with FIGS. 1-7, the decoration 200 may include the hollow portions 122, the central portion 132, the substantially solid members 142, the light sources 128, the central light source 138, the circuit 170, and other previously described components. Furthermore, the decoration 200 may have similar decorative elements (e.g., openings 124 and surface patterns 134 and 144) and similar lighting effects, as previously described in connection with FIGS. 1-7. In the depicted embodiment, the projector device 260 may include an outer shell 261 that houses the projection light source 268, the image-bearing mask 262, and one or more lenses 265, 266, and 267. The projector device 260 may be electrically connected to the circuit 170 using a wire 269. The projection device 260 may be readily assembled into the base 110 without the need to individually insert and align the projection light source 268, the image-bearing mask 262, and the lenses 265, 266, and 267. As such, the assembly time and costs may be reduced because the lenses and image pattern can be retained and aligned within the outer shell 261 before the final assembly of the decoration 200 occurs. In this embodiment, the projection device 260 is simply inserted into the appropriate portion of the base 110 and then electrically connected to the circuit 170 using the wire.

Figure 9:
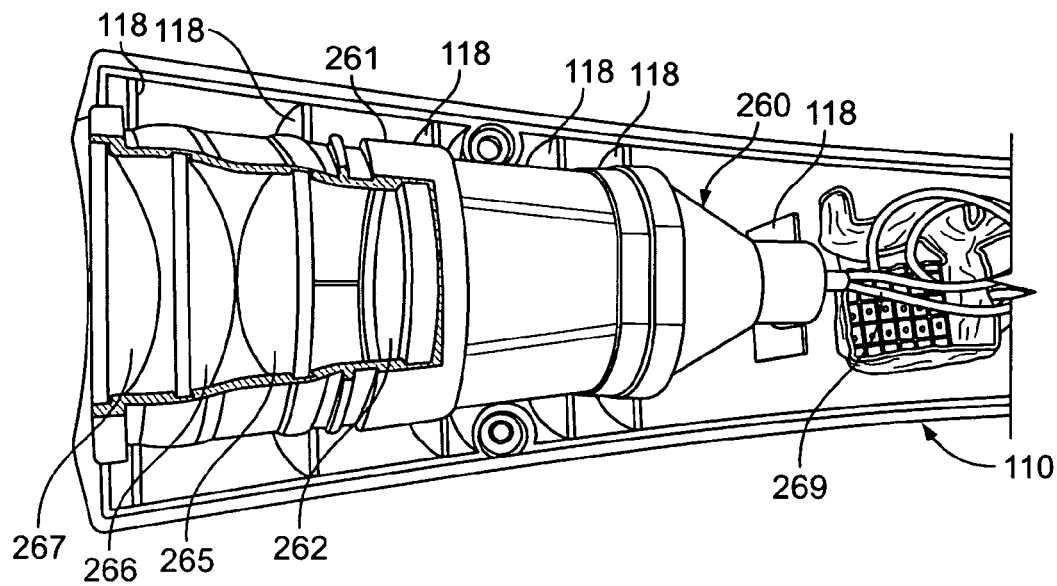
FIG. 9 is a section view of a portion of the decoration apparatus of FIG. 8.

Referring to FIG. 9, the projector device 260 may be secured in the base 110 using one or more retainer members 118. The retainer members may be integrally formed with the base 110 so that, when the base 110 is assembled, the retainer members 118 are mateable with complimentary circumferential grooves formed in the outer shell 261 of the projector device 260. Such a configuration permits the projector device 260 to be readily installed into the base 110. Furthermore, the retainer members 118 may be used during assembly to assure that the projector device 260 is substantially aimed in the predetermined direction (e.g., upwardly, angled incline, or another direction).

Figure 10:
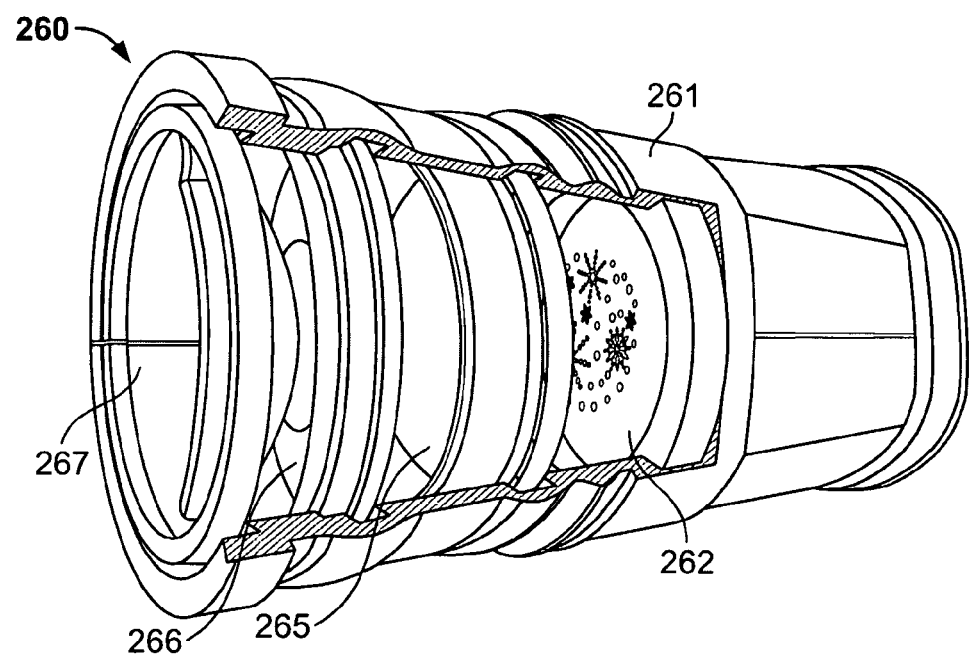
FIG. 10 is a section view of a projector device in accordance with some embodiments of the invention.
Figure 11:
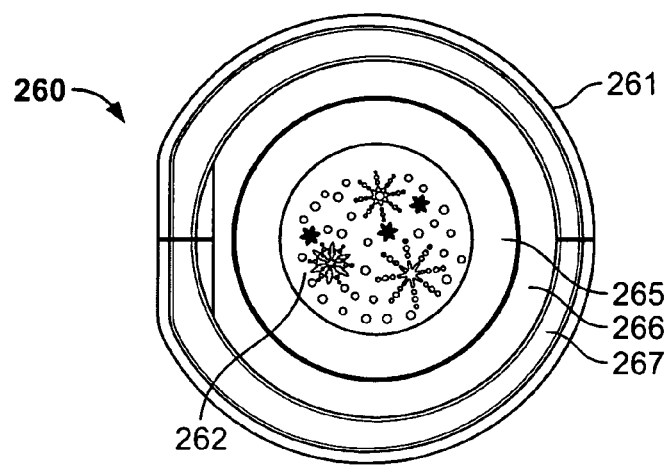
FIG. 11 is a top view of the projector device of FIG. 10.

Referring to FIGS. 10-11, the projector device 260 may be assembled such that an image-bearing mask 262 is disposed between the projection light source 268 (as shown, for example, in FIG. 12) in the base of the device and the one or more lenses 265, 266, and 267. The image-bearing mask 262 may include, for example, a stencil having apertures through which light from the projection light source 268 may pass. In another example, the image-bearing mask 262 may be a film negative having substantially transparent or translucent portion through which light from the projection light source 268 may pass. In this embodiment, the light from the projection light source 268 passes through the lenses 265, 266, and 267 so as to magnify and focus the lighted pattern into a projected image. For example, the projected image may be about 20-inches wide when projected onto the targeted surface at a distance of about 24-inches from the projector device 260. In this embodiment, the projector device 260 is arranged to provide the light pattern in a generally upward direction (see, e.g., FIG. 8), yet other embodiments of the decoration 200 may include a projector device 260 that is capable of projecting a light pattern in a non-vertical direction, such as angled at an incline toward a wall surface, directed sideways toward a wall surface, or angled downwardly toward a nearby floor surface.

Figure 12:
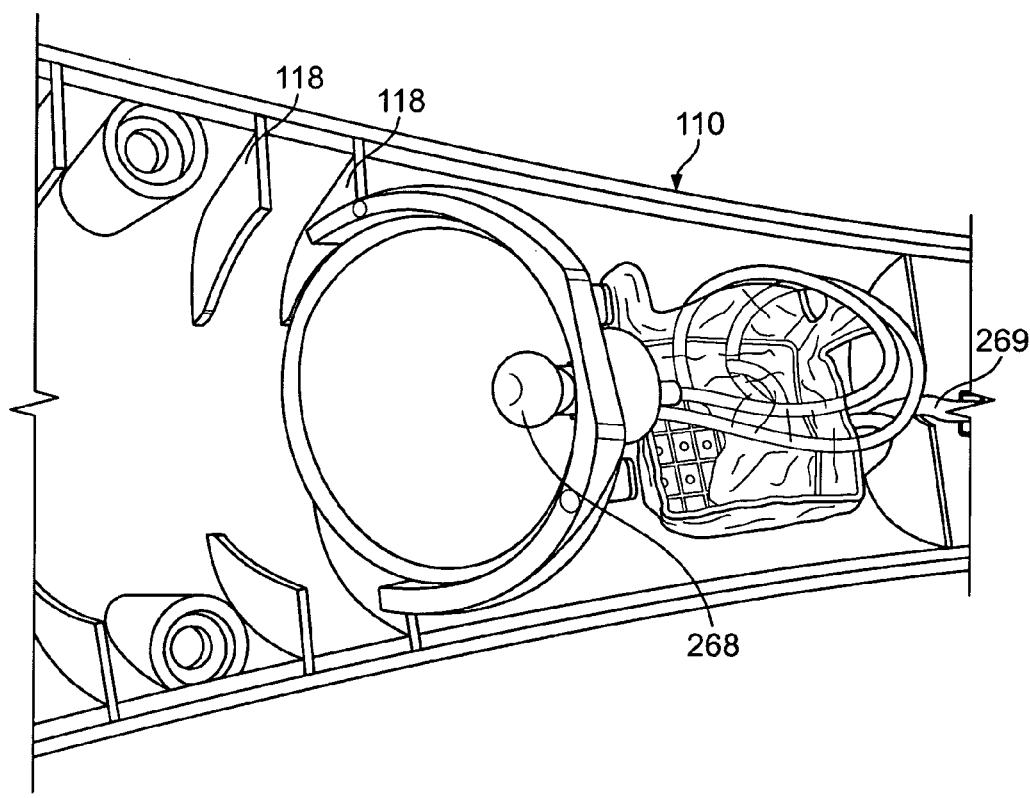
FIG. 12 is a section view of a portion of the projector device and a portion of the decoration apparatus of FIG. 8.

Referring to FIG. 12, the projection light source 268 may be disposed in a conical base portion of the projector device 260. The conical base portion may have a reflective interior surface so that the light emitted from the projection light source 268 is substantially directed outwardly toward the image pattern 262 (FIGS. 10-11) and the lenses 265, 266, and 267. As previously described, the projection light source 268 may be a megabright light-emitting diode (single or multicolor) so as to provide greater clarity and brightness to the lighted pattern projected to the nearby surface. In one example, the projection light source 268 may be a water-clear white UB light-emitting diode having a brightness of 13,000 mcd (Millicandelas) or greater.

Figure 13:
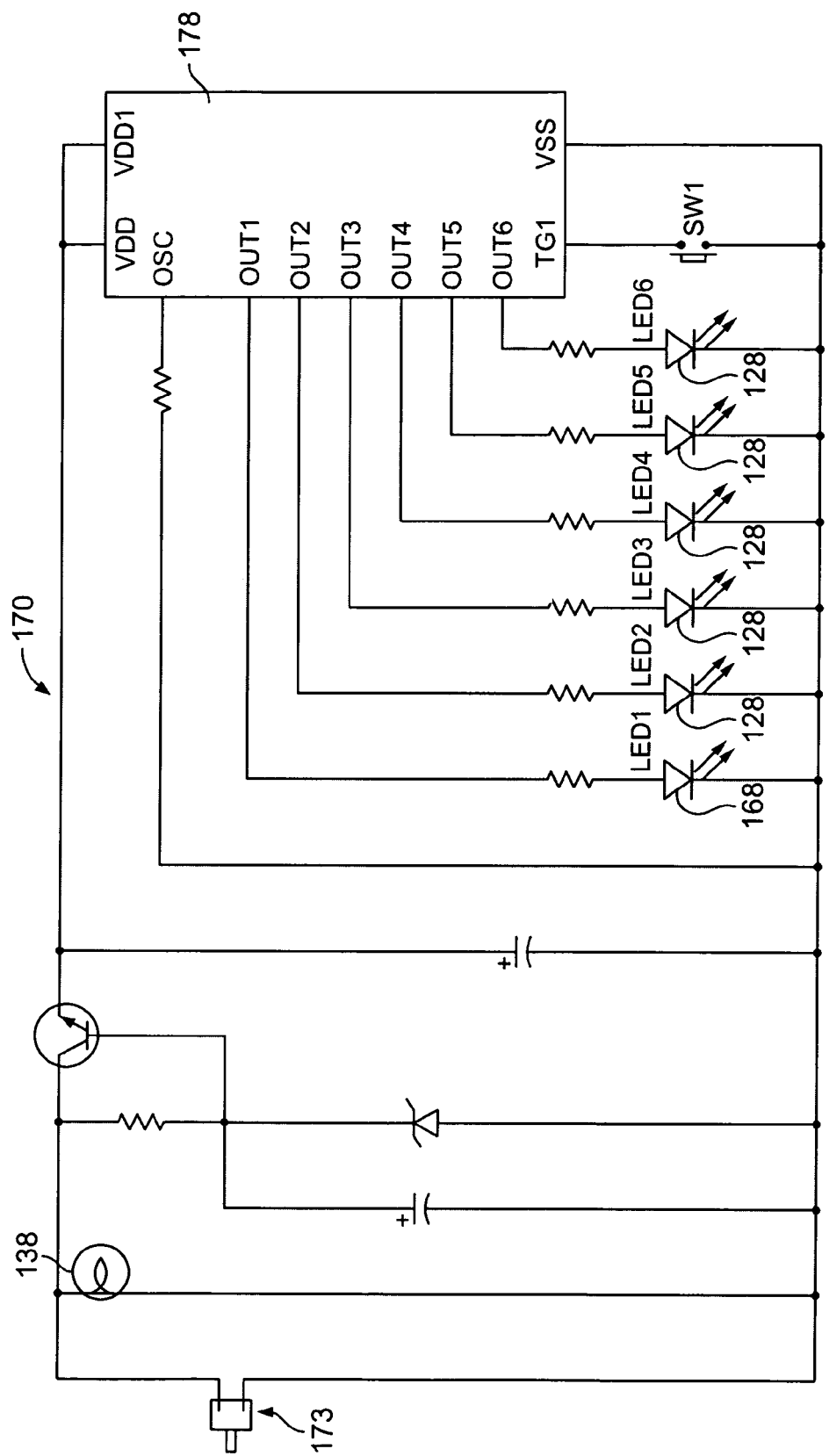
FIG. 13 is a schematic diagram for a decoration apparatus in accordance with some embodiments of the invention.

Referring now to FIG. 13, the circuit 170 described in connection with FIGS. 3 and 8 may include a programmable controller 178 to independently illuminate and dim any combination of the light sources. In this embodiment, a power source 173 supplies the circuit 170 with power. The power source could be, for example, a battery power supply, or a AC-DC adapter, or any other DC power source. As previously described in connection with FIGS. 3 and 8, the power source may be connected to the circuit 170 via a wire 172. At least one of the light sources may be powered without the use of the controller 178. For example, the light source 138 (FIGS. 3 and 8) may be constantly illuminated when power is provided to the circuit 170. In such embodiments, the light source 138 is not controlled by signals from the controller 178. In other embodiments (not shown in FIG. 13), the light source 138 could be controlled by the controller 178.

The controller 178 may include multiple outputs to individually control one or more light sources or other light sources. For example, as shown, the controller 178 includes an output (OUT1) to control the projection light source 168. The controller 178 may be capable of being programmed to apply a voltage to the projection light source 168, and the voltage may vary over time. With the current limiting resistor in place, as shown in FIG. 13, a change in the voltage at the output causes a change in current through the light source, which may result in a corresponding change in brightness of the light source 168. Based on time variation in the voltage output, the controller 178 may cause the light source 168 to turn on, turn off, or maintain varying levels of brightness. Similarly, each of the light sources 128 may be coupled to an independent output of the controller 178. Again, the controller 178 may turn on, turn off, or selectively increase or decrease the light intensity of each light source 128 by varying the applied voltage. The voltage may be varied over time to illuminate the light sources in a particular pattern or at predetermined time intervals. For example, the controller 178 may store a one or more time-varying voltage patterns for each output that may, for example, be repeated or randomly selected.

In some embodiments, at least a portion of the circuit 170 may be formed on a printed circuit board that is configured to fit within the housing of the base 110 (as shown, for example, in FIGS. 3 and 8). The programmable controller 178 may be a commercially available electronic device or a more complex module, depending on the sequencing of the control signals and the technology used to project the light pattern. For example, in some implementations, the programmable controller 178 could comprise a voice synthesizer device capable of storing one or more channels of data that can be output as time-varying voltage waveforms. In certain embodiments, the circuit 170 may include other components, such as a nonvolatile memory module (e.g., a flash memory module) or a high speed processor unit. Some of these additional components may be employed, for example, in embodiments in which the projected image changes over time (e.g., a numeric countdown of days until a celebrated event), the projected image includes motion, or the projected image includes a digital image uploaded by a user, as described in more detail below.

Referring now to FIGS. 14-15, another embodiment of a decoration 300 may include a projector device 360 that is capable of projecting an image that changes over time, includes a moving object, or includes a digital image uploaded by a user. As previously described in connection with FIGS. 1-7, the decoration 300 may include the hollow portions 122, the central portion 132, the substantially solid members 142, the light sources 128, the central light source 138, and other previously described components. Furthermore, the decoration 300 may have similar decorative elements (e.g., openings 124 and surface patterns 134 and 144) and similar lighting effects, as previously described in connection with FIGS. 1-7. In the depicted embodiment, the upper portion of the base 110 is angled rearwardly so that the projector device 360 is not directed vertically upward. In such circumstances, the decoration 300 may be used to project an image onto a nearby surface, such as a ceiling 302 or a wall 303 (see, e.g., FIGS. 16-17). Also, the decoration 300 may have a data input port 385 to receive a data cable or to receive a removable memory device. The data input port 385 may be employed, for example, in embodiments in which the circuit 370 includes a memory module 375.

Referring to FIG. 15, certain embodiments of the projector device 360 may include an LCD (liquid crystal display) projection panel 362 disposed near a projection light source 368 so that light from the projection light source 368 may be transmitted through the LCD projection panel 362. The LCD projection panel 362 may include an active region 363 disposed between two substantially transparent or translucent panels. In such circumstances, the circuit 370 may be electrically connected to the LCD projection panel 362 using a wire 364 so that at least one controller on the circuit 170, such as a commercially available LCD display controller chip, may modify the image that is displayed in the active region 363 of the LCD projection panel 362. In one example, the LCD projection panel may have a display area of about 0.75 square inches to about 1.25 square inches and may be capable of displaying moving images in the active region 363. Also in this example, the LCD projection panel may be capable of displaying multicolor images in the active region 363 using a two-dimensional array of red, green, and blue subpixels in the active region. Similar to the embodiment previously described in connection with FIG. 8, the projector device 360 may be preassembled into a shell housing so as to facilitate prompt assembly of the decoration 300.

Figure 16:
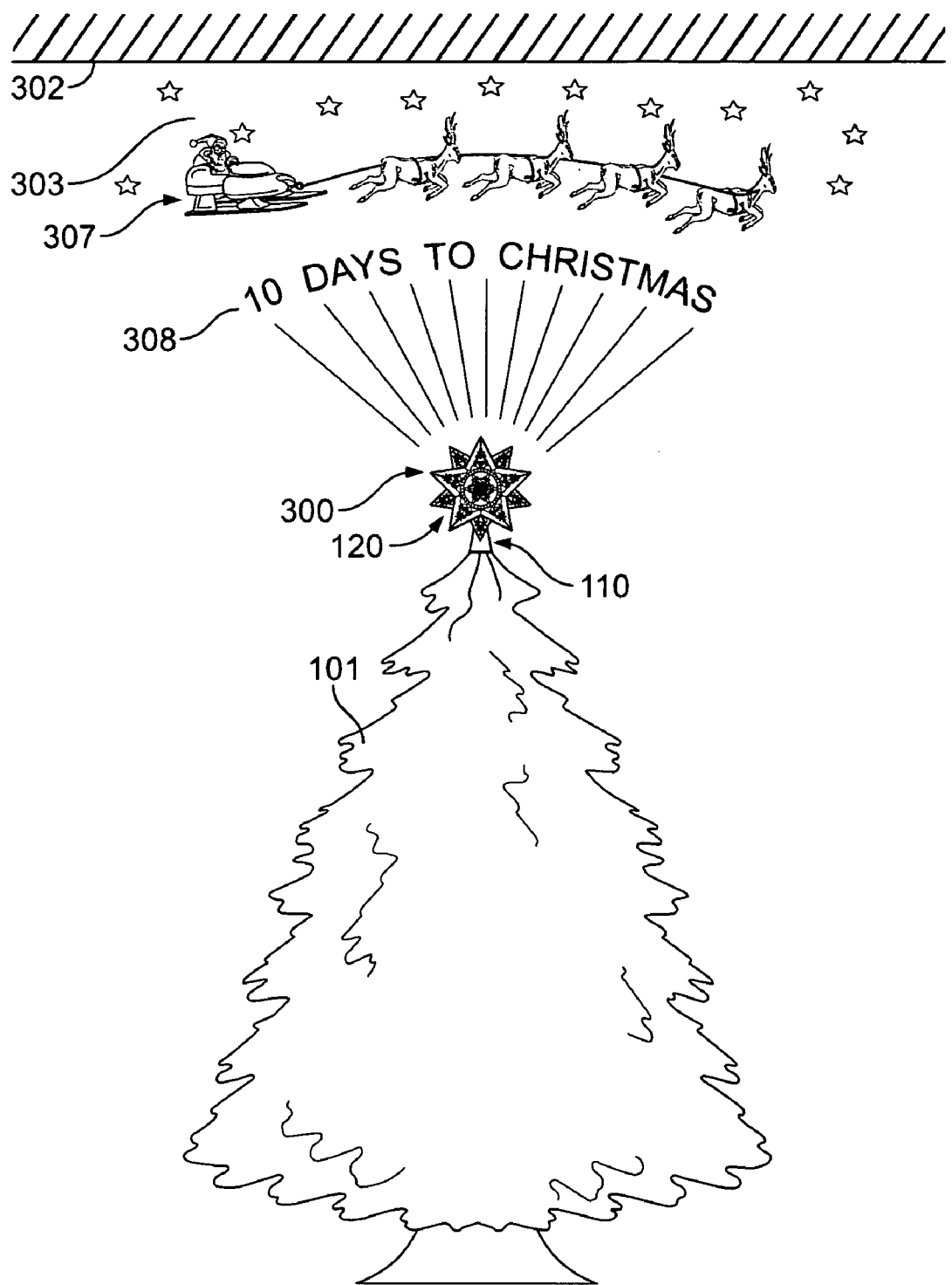
FIG. 16 is a front view of a tree and the decoration apparatus of FIG. 14, in accordance with an embodiment of the invention.
Figure 17:
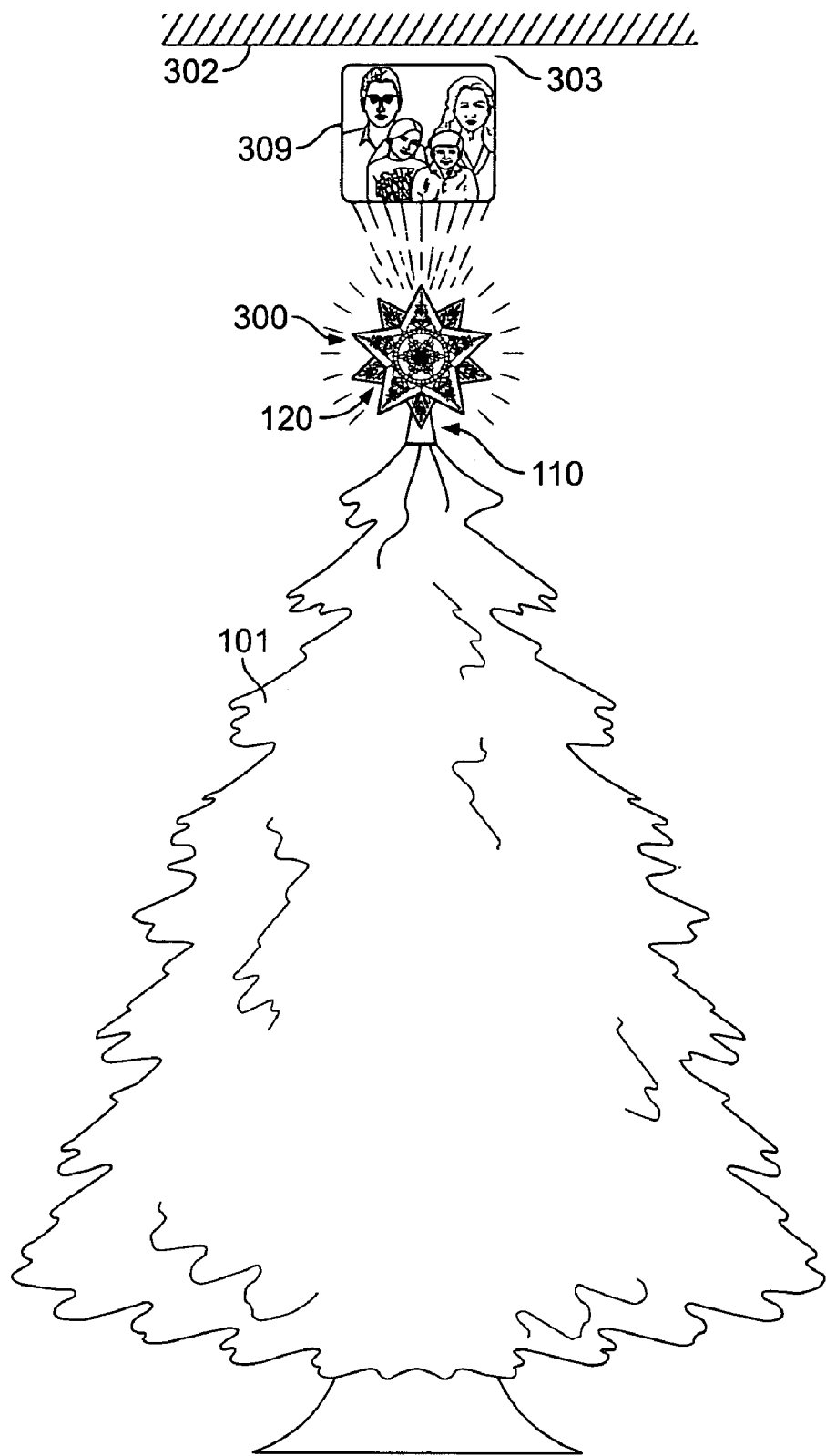
FIG. 17 is a front view of a tree and the decoration apparatus of FIG. 14, in accordance with yet another embodiment of the invention.

When an image is displayed in the active region 362 of the LCD projection panel 362, the projection light source 368 may transmit light through the panel 362, through the lenses 366 and toward a nearby surface, such as a ceiling 302 or a wall 303 (FIGS. 16-17). The projection light source 368 may be housed in a conical structure 369 having a reflective coating on the interior so that the light from the projection light source 368 is substantially reflected or transmitted out toward the LCD projection panel 362. In some embodiments, the projection light source 368 may comprise a halogen bulb or a light-emitting diode that is capable of emitting light at a brightness of 50,000 mcd (Millicandelas) or greater.

As previously described, the circuit 370 may be equipped with a nonvolatile memory module 375 that is capable of storing electronic data, such as a digital image file or data related to a sequence of images to be displayed in the LCD projection panel 362. In embodiments in which the circuit is at least partially formed on a printed circuit board, the memory module 375 may be, for example, a flash memory chip that is surface mounted to the circuit board. Alternatively, the memory module 375 may include a media that is removable, such as an SD memory chip. The data input port 385 (FIG. 14) may be disposed proximal to the memory module 375 so that the memory module may be removably inserted from outside the housing of the decoration 300. In one example, the port 385 may be a female jack to receive a data cable, through which a digital image file may be transferred to the memory module 375. In another example, the port 385 may be embodied as a slot to receive a removable media, such as an SD memory chip.

Still referring to FIGS. 14-15, the memory chip 375 may be accessible by other components of the circuit 370 (e.g., a display controller) so that data stored in the memory module 375 may be used to display an image (or a sequence of images) in the active region 363 of the LCD projection panel 362. In some embodiments, a user may transfer a digital image file (or a series of digital image files) through the data input port 385 and into the memory module 375. When the decoration 300 is activated, the data stored in the memory module 375 may be used by the display controller (having the associated LCD driving circuitry) to display an image in the active region 363 of the LCD projection panel 362. When the projection light source 368 to be illuminated, the light is transmitted from the light source 368, through the LCD projection panel 362, through the one or more lenses 366, and toward a nearby surface. As such, the LCD projection panel 362 may be used to project an image that changes over time (e.g., a numeric countdown of days until a celebrated event), images appear to have motion, or one or more digital images (e.g., personal photographs) that were uploaded by a user.

Referring now to FIG. 16, the decoration 300 that is equipped with the projector device 360 (having the LCD projection panel 362) may be used to display an image that changes over time. In this embodiment, the displayed image 307 includes an element 308 that changes during predetermined time intervals, both of which may be projected from the LCD projection panel 362 (FIG. 15) of the projection device 360. For example, the decoration 300 may be embodied as a tree topper device that is secured to the top portion of a Christmas tree 101. In such circumstances, the decoration 300 may be used to project an image to a nearby wall 303 (or a ceiling 302) that includes an image of Santa Claus and a countdown element 308. The countdown element 308 may numerically count down the number of days until Christmas is celebrated. For example, the countdown element may show the numeral "10" on December 15 and may change to show the numeral "9" on December 16. By displaying this type of a changing image 307, the decoration 300 provides both adornment for the Christmas tree 101 and a pleasurable image displayed on the wall 303 (or the ceiling 302) that builds the anticipation for celebrated event. It should be understood, that other embodiments of the decoration 300 may be configured to display other Christmas related images, such as stars, angels, bells, holly, or the like. Also, the decoration 300 may be configured to display other images related to a particular event or season that is being celebrated, such as a menorah for Chanukah celebration, a graduation cap for a graduation celebration, fireworks for a July $4^{th}$ celebration, or the like. Furthermore, other embodiments of the decoration 300 may be capable of displaying a sequence of images so that the projected pattern appears to have motion. For example, the projected image 307 shown in FIG. 16 may include a Santa Clause that appears to move from the left side to the right side. Such a sequence of images may be periodically repeated by the decoration 300 and may be used in combination with the countdown element 308 or other changing image.

Referring now to FIG. 17, the decoration 300 that is equipped with the projector device 360 (FIG. 15) may be used to display one or more digital images, including personal photographs. As previously described, some embodiments of the decoration may include a data input port 385 (FIG. 14) so that the user may upload the digital images to the memory module 375 (FIG. 15). In the embodiment depicted in FIG. 17, the displayed image 309 includes a digital photograph having sentimental value to the user. For example, the image 309 may show a family portrait, a photograph of a deceased relative, or the like. As previously described, the decoration 300 may be embodied as a tree topper device that is secured to the top portion of a Christmas tree 101 so that the image 309 may be projected to a nearby wall 303 (or a ceiling 302). By displaying an image 309 from the user of the decoration 300, the decoration 300 provides both adornment for the Christmas tree 101 and a sentimental image displayed on the wall 303 (or the ceiling 302). In some embodiments, the decoration 300 may be capable of displaying a sequence of digital image files that are stored in the memory module 375 (FIG. 15). The sequence of images 309 that are projected onto the nearby surface 303 or 302 may include images of different relative or friends. In such circumstances, the projected images 309 may appear as a slide show of digital image files that cycles at predetermined time intervals.

In an alternative embodiment, the decoration 300 may be capable of projecting one or more personal photographs using a slide or film having the desired image pattern thereon. In such circumstances, the projector device may operate without the use of the LCD projection panel 362. Rather, the light from the projection light source 368 may be passed through the film pattern and focused onto the targeted surface using one or more lenses, similar to some embodiments of the previously described image-bearing masks.

Various embodiments of the decoration 100, 200, or 300 may have an appearance other than the star-shaped structure shown in FIGS. 1-8 and 14-17. For example, some embodiments of the decoration may have a shape familiar to an applicable season or event, such as the shape of an angel or a Santa Claus character that is sometimes associated with the Christmas season. In another example, the decoration may have a shape of a menorah that is associated with the celebration of Chanukah. In such circumstances, the image that is projected onto the nearby surface may include elements that are associated with the applicable season or event.

Certain embodiments of the decoration may be configured to be mounted in a location other that a tree top. For example, other embodiments of the decoration may be configured to be placed on a mantle, a tabletop, a wall, or other decorative locations. In those embodiments, the base of the decoration may a flat panel or a mounting bracket so as to facilitate placement of the decoration in the intended location.

A number of embodiments of the invention have been described. Nevertheless, it will be understood that various modifications may be made without departing from the spirit and scope of the invention. Accordingly, other embodiments are within the scope of the following claims.

What is claimed is:

1. A tree topper decoration apparatus, comprising:
   an ornament portion having a plurality of decorative elements formed in the ornament portion;
   a base portion to releasably couple the ornament portion to a top portion of a tree;
   a projector device having a projection light source and having an image-bearing element and at least one lens disposed proximate to the projection light source, wherein the at least one lens and the image-bearing element are separate from one another;
   wherein when the projection light source is activated, light is projected through the image-bearing element to project an image onto a surface remote from the projector device.

2. The apparatus of claim 1, further comprising a programmable controller to selectively illuminate the projection light source.

3. The apparatus of claim 1, wherein the image projected onto the remote surface has a theme associated with at least a portion of the decorative elements formed in the ornament portion.

4. The apparatus of claim 1, further comprising at least one ornament light source disposed in an interior space of the ornament portion such that, when the ornament light source is activated, light is emitted through the decorative elements of the ornament portion.

5. The apparatus of claim 4, wherein the ornament portion includes a plurality of adjacent hollow shell portions, each hollow shell portion having an associated ornament light source disposed therein.

6. The apparatus of claim 5, wherein each of the hollow shell portion includes a front wall and apertures formed in the front wall so that light from the associated ornament light source projects through the apertures.

7. The apparatus of claim 6, further comprising at least one programmable controller to selectively illuminate the ornament light sources disposed in the plurality of hollow shell portions.

8. The apparatus of claim 4, wherein the ornament portion includes a centrally disposed cavity at least partially defined by a front wall, further comprising a centrally located ornament light source in the centrally disposed cavity.

9. The apparatus of claim 8, further comprising a surface pattern formed in the front wall of the centrally disposed cavity such that light from the centrally located ornament light source illuminates the surface pattern.

10. The apparatus of claim 1, wherein the image-bearing element is removable from the projector device.

11. The apparatus of claim 1, wherein the image-bearing element comprises an LCD panel, the LCD panel comprising an active region operable to display an image.

12. The apparatus of claim 11, further comprising a controller coupled to the LCD panel to periodically modify the image displayed in the active region.

13. The apparatus of claim 12, further including nonvolatile memory to store at least one digital image, the nonvolatile memory being coupled to controller so as to display the digital image in the active region of the LCD panel.

14. The apparatus of claim 13, wherein a user may upload one or more digital images to the nonvolatile memory.

15. The apparatus of claim 1, wherein the ornament portion has the appearance of a star.

16. The apparatus of claim 1, wherein the projector device is oriented parallel to a vertical axis so as to project the image in a substantially vertical direction onto the surface.

17. The apparatus of claim 1, wherein the projector device is oriented parallel to a non-vertical axis so as to project the image in a substantially non-vertical direction onto the surface.

18. The apparatus of claim 1, wherein the projector device comprises a plurality of lenses disposed proximate to the projection light source so as to focus the image projected onto the surface.

19. The apparatus of claim 1, wherein the image-bearing element comprises at least one of a film having an image formed thereon or a stencil having apertures through which light may pass.

20. A tree topper decoration apparatus, comprising:
   an ornament portion having a plurality of decorative elements formed in the ornament portion;
   a base portion to releasably couple the ornament portion to a top portion of a tree;
   a projector device having a projection light source and having an image-bearing element and a plurality of lenses disposed proximate to the projection light source so as to focus the image projected onto a surface remote from the projector device;
   wherein when the projection light source is activated, light is projected through the image-bearing element to project an image onto the surface remote from the projector device, the projector device being oriented parallel to a vertical axis so as to project the image in a substantially vertical direction onto the surface.

21. The apparatus of claim 20, wherein the image projected onto the remote surface has a theme associated with at least a portion of the decorative elements formed in the ornament portion.

22. The apparatus of claim 20, wherein the projector device is oriented parallel to a vertical axis so as to project the image in a substantially vertical direction onto the surface.

\* \* \* \* \*